United States Patent [19]

Copes

[11] 3,850,610

[45] Nov. 26, 1974

[54] HERBICIDAL METHOD
[75] Inventor: Joseph P. Copes, Easton, Pa.
[73] Assignee: GAF Corporation, New York, N.Y.
[22] Filed: Oct. 18, 1971
[21] Appl. No.: 190,289

[52] U.S. Cl. ................................................. 71/103
[51] Int. Cl............................................ A01n 9/14
[58] Field of Search ...................................... 71/103

[56] References Cited
UNITED STATES PATENTS
2,651,645   9/1953   Cross ................................. 260/401

OTHER PUBLICATIONS
Ernst et al., Chem. Abst., Vol. 70, (1969), 112467j.
Ostrowski, Chem. Abst., Vol. 69, (1968), 42952s.

*Primary Examiner*—Lewis Gotts
*Assistant Examiner*—Catherine L. Mills
*Attorney, Agent, or Firm*—Walter C. Kehm; Samson B. Leavitt

[57] ABSTRACT

Herbicidal compositions comprising as the active ingredient a herbicidally effective amount of an alkali metal N-acyl-N-alkyltaurate.

9 Claims, No Drawings

HERBICIDAL METHOD

This invention relates to herbicidal compositions including as the essential active constituent an alkali metal N-acyl-N-alkyl-taurate and to the use of these compositions for the control of weeds.

The herbicidally active compounds of this invention include taurine salts having the formula

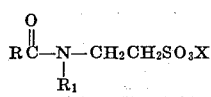

wherein $R_1$ is alkyl containing 4–12 carbon atoms, R is alkyl containing 3–11 carbon atoms and X is an alkali metal atom.

Within the above composition the term "alkyl" includes butyl, hexyl, octyl, dodecyl and the like and the term "alkanoyl" as used hereinafter includes butyryl, octanoyl, decanoyl, and the like. Alkali metal designates sodium, potassium, lithium, etc.

Examples of preferred taurates in accordance with the invention are those with the following substituents: N-decanoyl-N-hexyl, N-butyl-N-dodecanoyl, N-butyryl-N-dodecyl, N-butyl-N-decanoyl- and N-octanoyl-N-octyl-. The preferred taurate is sodium-N-octanoyl-octyl taurate.

The taurine salts of the invention are among known surfactants comprising both high and low foaming detergents, wetting agents, and dispersants. They are soluble in hot and cold water and in aqueous solutions of metallic ions. They have and are being extensively used in processing textiles, paper and rubber and in formulating detergents, cosmetics and the like.

In accordance with the invention it has now been found the same surfactants constitute herbicidally active compounds.

The compounds of the invention are prepared by methods described in the literature as for instance U.S. Pat. No. 2,651,645. As disclosed in that patent, sodium-N-octanoyl-N-octyl taurate is prepared by heating in an autoclave hydroxy ethyl sulphonic acid with octylamine in water to 180°–240°C. under alkaline conditions. There is thereby formed the intermediate N-octyl taurine which is then reacted with octanoyl chloride in the presence of an acid acceptor at moderate temperatures of 0°–60°C. Alternatively, the N-octyl taurine can be reacted directly with octanoic acid at 200°C. in the presence of a catalyst, for example, hypophosphorous acid ($H_3PO_2$). The other compounds of these series are prepared by the same methods but with the reactants selected to produce the desired taurine.

In accordance with the invention it has been found that certain alkali metal N-acyl-N-alkyl taurates, previously known for their surface active properties, when dissolved in water and applied to the foilage of noxious weeds, exhibit herbicidal activity. The weeds treated by application thereto of the clear solution of alkali metal N-acyl-N-alkyl taurate cease to grow, turn brown, dry up, become necrotic and die. Among the weeds which can be treated effectively with the compounds as above defined there may be mentioned wild mustard, red rooted pigweed, dandelion, plantain, monks hood, field blindweed, dock, black medic, crabgrass and other weedy grasses.

The compounds are herbicidally active when applied at rates as low as 2 pounds per acre, and 5 pounds per acre is sufficient in the case of most species. A few of the more resistant species may require 10 or more pounds per acre for complete kill. The compounds are readily soluble in water and may be diluted for use with water using for instance, 5 pounds of compound for 50 gallons of spray which may more conveniently be distributed over an acre using conventional spraying equipment. The compounds are useful in controlling many of the types of noxious weeds which are found in connection with crops, such as corn, the latter not being affected at the moderate application rates involved.

The herbicidally active compounds are composed only of the elements carbon, hydrogen, nitrogen, oxygen, sodium and sulfur; no chlorine being present. Therefore neither the compounds themselves or their degradation or metabolic products produce harmful residues which adversely affect ecology.

The following examples are offered to further illustrate the invention without anywise limiting the scope thereof. The Examples illustrate the effects of the compounds, and point up the remarkable and unexpected nature and magnitude of the activity thereof as herbicidal agents.

EXAMPLE I

N-octanoyl-N-octyl-taurine, sodium salt, was dissolved in water and applied as a fine spray at a rate of 10 pounds per acre to a flat of velvet leaf (Abutilon Theophrasti) seedlings four weeks after emergence. At the end of 10 days the seedlings had withered, turned brown and died.

EXAMPLE II

The compound of Example I was applied to a similar flat of pigweed (Amaranthus retroflexus) seedlings by spraying at a rate of 3 pounds per acre. After 2 weeks the seedlings were badly withered, shriveled and some had died.

EXAMPLE III

Wild field bindweed (Convolvulus arvensis) was treated with the compound of Example I at 15 pounds per acre. After 10 days all had been killed.

EXAMPLE IV

A flat of recently emerged Brassica kaber (wild mustard) was treated with 7 pounds per acre of the compound of Example I by spraying. At the end of a two week period, all of the seedlings were killed.

EXAMPLE V

A flat of field corn seedlings was sprayed thoroughly at a rate of 6 pounds per acre using the compound of Example I, and observed for a 15 day period. No deviation from the behavior of the controls was observed. However, when applied at a rate of 10 pounds per acre minor spotting of the leaves occurred.

The above example demonstrates the weed killing ability of the compounds and points out the non-herbicidal effects for non-weeds.

EXAMPLE VI

A solution of N-dodecanoyl-N-ethyl taurine, sodium salt, (a known surface active agent) was applied to flats of the same weeds as set forth in Examples I, II, III, and IV at a rate of 10 pounds per acre. No difference from the controls was observed in any case. This example serves to establish specificity of the claimed compounds when compared to rather closely related compounds which were entirely ineffective for the tested purpose.

EXAMPLE VII

Example VI was repeated as the known compound N-cyclohexyl-N-hexadecoyl taurine in the form of its alkali metal salt. This compound which is related to the compounds of the invention did not demonstrate weed killing ability.

Also tested for activity and found ineffective against the foregoing weeds were the following sodium taurates: N-dodecanoyl-N-methyl-; N-hexanoyl-N-methyl; N-oleoyl, & N-dodecanoyl.

Examples I, II, III, and IV were repeated using sodium taurates with the following substituents: N-decanoyl-N-hexyl; N-butyl-N-dodecanoyl; N-butyryl-N-dodecyl; N-butyl-N-decanoyl. The herbicidal action on the weeds was substantially the same in each case.

The alkali metal N-acyl-N-alkyl-taurates of the invention may be employed in any of the physical forms in which herbicides are customarily used, in all cases in association with an inert diluent. The alkali metal N-acyl-N-alkyl-taurates in accordance with the invention are soluble in water and can be utilized in the form of their aqueous solutions as herbicidal agents. Where application in a liquid form is desired. Alternatively, they may be used as solid compositions in conjunction, with solid diluents such as talc, clay or other such inert material. Specific compositions include aqueous solutions of water soluble salts which may contain a wetting agent, powders in association with diluent powder and wetting agent, oil emulsions containing the salt, in the form of a micronized suspension.

I claim:

1. A method for the post-emergence control of weeds which comprises contacting said weeds with an herbicidal composition including an inert carrier and, as an active constituent, a compound of the formula

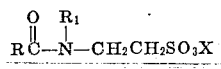

wherein R is alkyl containing 3 to 11 carbon atoms; $R_1$ is alkyl containing 4 to 12 carbon atoms and X is an alkali metal atom and applying said herbicidal composition in a quantity which is herbicidally toxic to said weeds.

2. A method according to claim 1 wherein said active constituent is the sodium salt of N-octanoyl-N-octyl taurine.

3. A method according to claim 1 wherein said active constituent is the sodium salt of N-dodecanoyl-N-hexyl taurine.

4. A method according to claim 1 wherein said active constituent is the sodium salt of N-butyl-N-dodecanoyl taurine.

5. A method according to claim 1 wherein said active constituent is the sodium salt of N-butyryl-N-dodecyl taurine.

6. A method according to claim 1 wherein said active constituent is the sodium salt of N-butyl-N-decanoyl taurine.

7. A method according to claim 1 wherein said weeds are contacted with an aqueous solution of said composition.

8. A method according to claim 1 wherein said compound is used in an amount of 2 to 10 pounds per acre.

9. A method according to claim 1 wherein said weeds are contacted with an active constituent in admixture with a solid diluent.

* * * * *